US009236965B2

(12) United States Patent
Adimatyam et al.

(10) Patent No.: US 9,236,965 B2
(45) **Date of Patent: *Jan. 12, 2016**

(54) TELEVISION INTERACTION INFORMATION AND RELATED ICONOGRAPHY

(75) Inventors: Venkata S. Adimatyam, Irving, TX (US); Sameer Vasant Gavade, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1107 days.

This patent is subject to a terminal disclaimer.

(21) Appl. No.: 12/631,898

(22) Filed: Dec. 7, 2009

(65) Prior Publication Data

US 2011/0138408 A1 Jun. 9, 2011

(51) Int. Cl.

| | |
|---|---|
| ***H04N 7/16*** | (2011.01) |
| ***H04H 60/32*** | (2008.01) |
| ***H04H 60/64*** | (2008.01) |
| ***H04H 60/37*** | (2008.01) |
| *H04H 60/46* | (2008.01) |
| *H04H 60/47* | (2008.01) |
| *H04H 60/74* | (2008.01) |

(52) U.S. Cl.
CPC ............ *H04H 60/64* (2013.01); *H04H 60/372* (2013.01); *H04H 60/46* (2013.01); *H04H 60/47* (2013.01); *H04H 60/74* (2013.01)

(58) Field of Classification Search
CPC ............ H04N 21/40; H04N 21/42204; H04N 21/431; H04N 21/45; H04N 21/47; H04N 21/4182; H04N 21/8352; H04N 21/4263; H04N 21/25866; H04N 21/6582; H04N 21/258; H04N 21/226; H04N 21/2365; H04N 21/266; H04H 60/64; H04H 60/46; H04H 60/47; H04H 60/74; H04H 60/372
USPC ............ 725/9, 14, 39, 46, 52, 110, 132, 146, 725/28, 36, 15, 53, 49, 107, 131, 114, 116, 725/88; 709/218, 231; 704/1; 386/124
See application file for complete search history.

(56) References Cited

U.S. PATENT DOCUMENTS

| | | | | |
|---|---|---|---|---|
| 2002/0087661 | A1* | 7/2002 | Matichuk | B60P 3/34 709/218 |
| 2004/0221309 | A1* | 11/2004 | Zaner | G06Q 10/10 725/46 |
| 2006/0036756 | A1* | 2/2006 | Driemeyer | G06F 17/3089 709/231 |
| 2006/0236342 | A1* | 10/2006 | Kunkel et al. | 725/52 |
| 2008/0005668 | A1* | 1/2008 | Mavinkurve et al. | 715/526 |
| 2008/0063381 | A1* | 3/2008 | Conroy et al. | 386/124 |
| 2008/0098450 | A1* | 4/2008 | Wu et al. | 725/132 |
| 2008/0235348 | A1* | 9/2008 | Dasgupta | H04H 60/64 709/218 |
| 2009/0222255 | A1* | 9/2009 | Cox | G06Q 10/107 704/1 |
| 2011/0078729 | A1* | 3/2011 | LaJoie et al. | 725/36 |
| 2011/0078731 | A1* | 3/2011 | Nishimura | G06F 9/4446 725/39 |

* cited by examiner

*Primary Examiner* — Nasser Goodarzi
*Assistant Examiner* — An Nguyen

(57) ABSTRACT

A method may include receiving identification information associated with each of one or more users. Interactions may be received from the one or more users relating to content displayed on a television device. Interaction information associated with the interactions may be captured, wherein the interaction information includes at least interaction type information, interaction status information, interaction origin information, and user identification information. The captured interaction information may be stored. A request to display at least some of the captured interaction information may be received. At least some of the captured information may be retrieved and displayed responsive to the request.

20 Claims, 7 Drawing Sheets

400

| User Name (410) | No. (411) | Admin (412) | Auth. Info (415) | Avatar file (420) | Mobile # (425) | Schedule (430) | Delete (435) | Modify (440) |
|---|---|---|---|---|---|---|---|---|
| 405-1 Bobby | 3 | N | **** | Blackhawk.png | 571-333-1212 | YES | OWN | OWN |
| 405-2 Dad | 1 | Y | **** | Photo1.jpg | 703-758-9586 | YES | YES | YES |
| 405-3 Mom | 2 | Y | **** | Seashell.png | 571-987-5689 | YES | YES | YES |
| 405-4 Susie | 4 | N | **** | Pony.png | | NO | NO | NO |

FIG. 4

TELEVISION INTERACTION INFORMATION AND RELATED ICONOGRAPHY

BACKGROUND

With the advent and deployment of expansive communications networks, personal entertainment options, such as television programs, on-demand movies, and the like, are becoming more plentiful and accessible. Furthermore, convergence of media options are making it increasingly possible for a single distribution device, such as a set-top box or media center computing device, to deliver many different types of television content, such as live television, recorded television, on-demand movies, games, Internet browsing, etc., in an easy-to-use manner.

BRIEF DESCRIPTION OF THE DRAWINGS

FIG. 4 illustrates a structure of an exemplary database for storing profile information captured by the profile logic of FIG. 3;

DETAILED DESCRIPTION OF PREFERRED EMBODIMENTS

Figure 1:
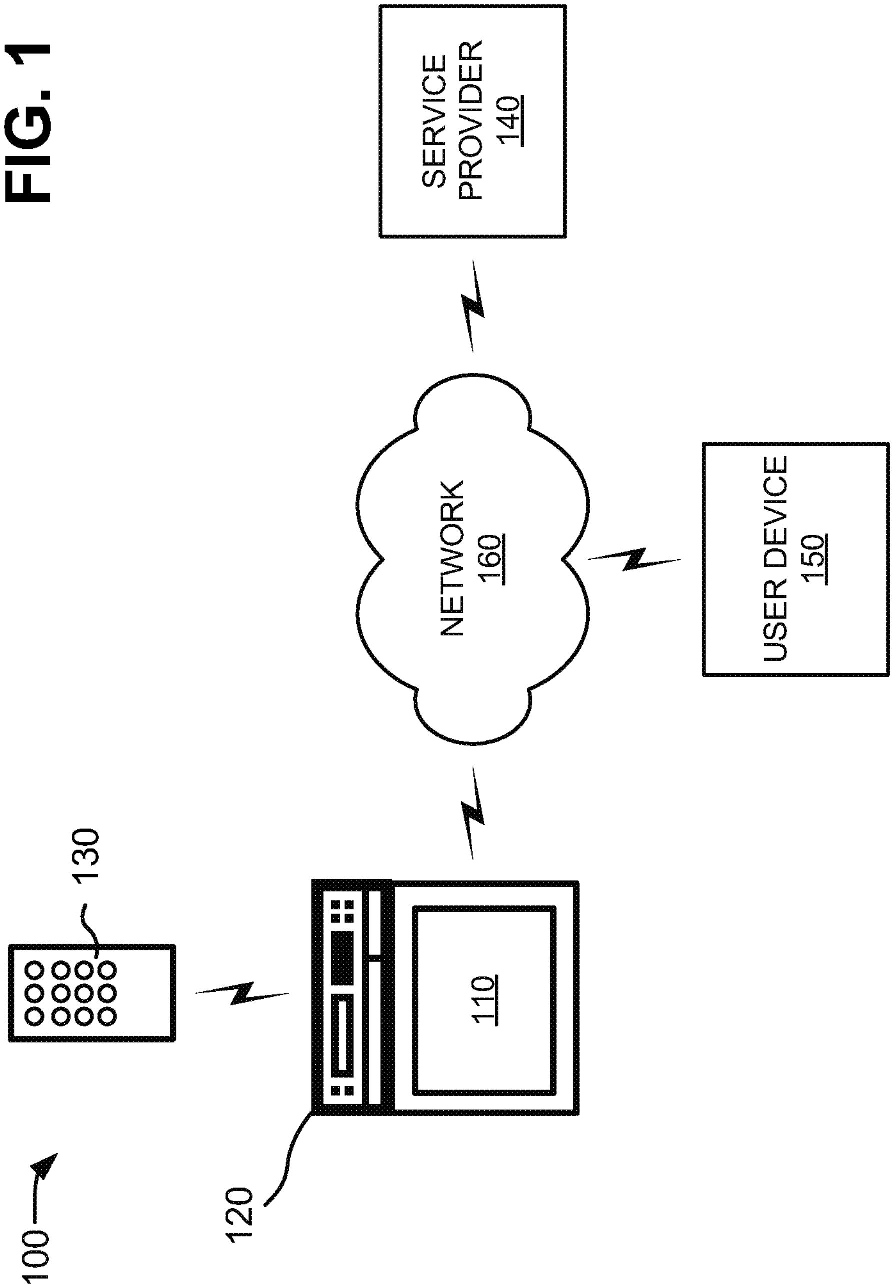
FIG. 1 depicts a diagram of an exemplary network in which systems and methods described herein may be implemented.

The following detailed description refers to the accompanying drawings. The same reference numbers in different drawings may identify the same or similar elements. Also, the following detailed description does not limit the invention.

Implementations described herein relate to devices, methods, and systems for facilitating the capture and subsequent review of television interaction information. In some implementations, a set-top box (STB), a display device (e.g., a television), or another electronic device may collect and store information relating to viewed and/or scheduled television content and the television related interactions. The collected television interaction information may include various details relating to the television content, such as type (e.g., live, recorded (e.g., via a digital video recorder (DVR) or a multiroom DVR), video on demand (VOD), video games, etc.), genre of programming, (e.g., kids, action, drama, comedy, sports, etc.), program names, etc. Furthermore, consistent with embodiments described herein, the collected information may further include ownership/user identification information associated with the stored/viewed content, as well as information relating to a manner in which the content was scheduled/selected.

In general terms, the collected television interaction information may be defined as metadata corresponding to television interactions and related content. Collecting such metadata may provide users with an accurate representation of usage activity relating to their account, such as who is doing what, when, and in what manner, etc. This information may enable the user (e.g., the account holder) to make changes or restrictions to their account, where appropriate.

Once collected and stored, the television interaction information may be presented to a user, such as an account holder or super-user, in a variety of manners, such as via a timeline view, a menu-driven view, or other types of graphical viewing options. In addition, in some implementations, the television interaction information for a number of different display devices or individual viewers (or groups of users) may be maintained and made available to a user associated with each display device or individual (e.g., an account holder, a homeowner, etc.). As described below, in some implementations, the television interaction information may be presented to the user using iconography or other graphical indicia for efficiently representing metadata elements in a simple, easy to understand manner.

The presented information and related iconography/graphical indicia may be used to identify user preferences for selecting programming options, etc., time restrictions, spending allowances/allocations, etc. In additional implementations, the television information may be used, e.g., by a video programming service provider, to subsequently suggest or automatically record television content for one or more viewers.

As used herein, the terms "viewer" and/or "user" may be used interchangeably. Also, the terms "viewer" and/or "user" are intended to be broadly interpreted to include a user device, a STB, and/or a television or a user of the user device, STB, and/or television.

FIG. 1 is a diagram of an exemplary network 100 in which systems and methods described herein may be implemented. As illustrated, network 100 may include a television (TV) 110, a STB 120, a remote control 130, a service provider 140, and a user device 150 interconnected by a network 160. Components of network 100 may interconnect via wired and/or wireless connections. A single television 110, STB 120, remote control 130, service provider 140, user device 150, and network 160 have been illustrated in FIG. 1 for simplicity. In practice, there may be more televisions 110, STBs 120, remote controls 130, service providers 140, user devices 150, and/or networks 160. Also, in some instances, one or more of the components of network 100 may perform one or more functions performed by another one or more of the components of network 100.

Television 110 may include any suitable display device capable of displaying television programs, content provided by STB 120, and/or content provided by other devices (e.g., a digital video disk (DVD) player, a video camera, a home media player, etc., not shown) connected to television 110.

STB 120 may include a device that receives television programming (e.g., from service provider 140), and provides the television programming to television 110 or another device. STB 120 may allow a user to alter the programming provided to television 110 based on a signal (e.g., a channel up or channel down signal, etc.) from remote control 130 and/or user device 150. In some implementations consistent with aspects described herein, STB 120 may record video in a digital format via a disk drive or other memory medium within STB 120. STBs of this type may also be referred to as digital video recorders (DVRs), and this term may be used interchangeably with the term STB. In one exemplary implementation, features of STB 120 may be incorporated directly within television 110. In some implementations, STB 120 may be configured to receive information from television 110, service provider 140, and/or user device 150 in the manner described below.

Remote control 130 may include a device that allows a user to control programming and/or content displayed on television 110 via interaction with STB 120. Furthermore, remote control 130 may facilitate interaction with various features related to viewing television interaction information on STB 120.

Service provider 140 may include one or more server entities, or other types of computation or communication devices, that gather, process, search, and/or provide information in a manner described herein. In one implementation, service provider 140 may include a server (e.g., a computer system or an application), a cable head-end, or a broadcaster capable of providing content (e.g., TV programming, movies, on-demand services, live television, news feeds, blog feeds, widgets, applications, etc.), advertisements, instructions, codes, encryption keys, and/or other information associated with products and/or services, etc., to STB 120. In some implementations, service provider 140 may be configured to receive information from STB 120, television 110, or user device 150 in the manner described below.

User device 150 may include a mobile telephone (e.g., a cell phone), a smart phone (e.g., that may combine a cellular radiotelephone with data processing and data communication capabilities), a personal digital assistant (PDA) (e.g., that can include a radiotelephone, a pager, Internet/intranet access, etc.), a laptop or notebook computer, a personal computer, an ultra mobile personal computer (UMPC), a netbook, or other types of computation or communication devices. In one implementation, user device 150 may include any device (e.g., an Internet Protocol (IP)-based device) that is capable of accessing service provider 140 and/or STB 120 via network 160. In other implementations, user device 150 may be configured to interact with STB 120 or television 110, via a local network different than network 160 (e.g., a home wired or wireless network).

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

Figure 2:
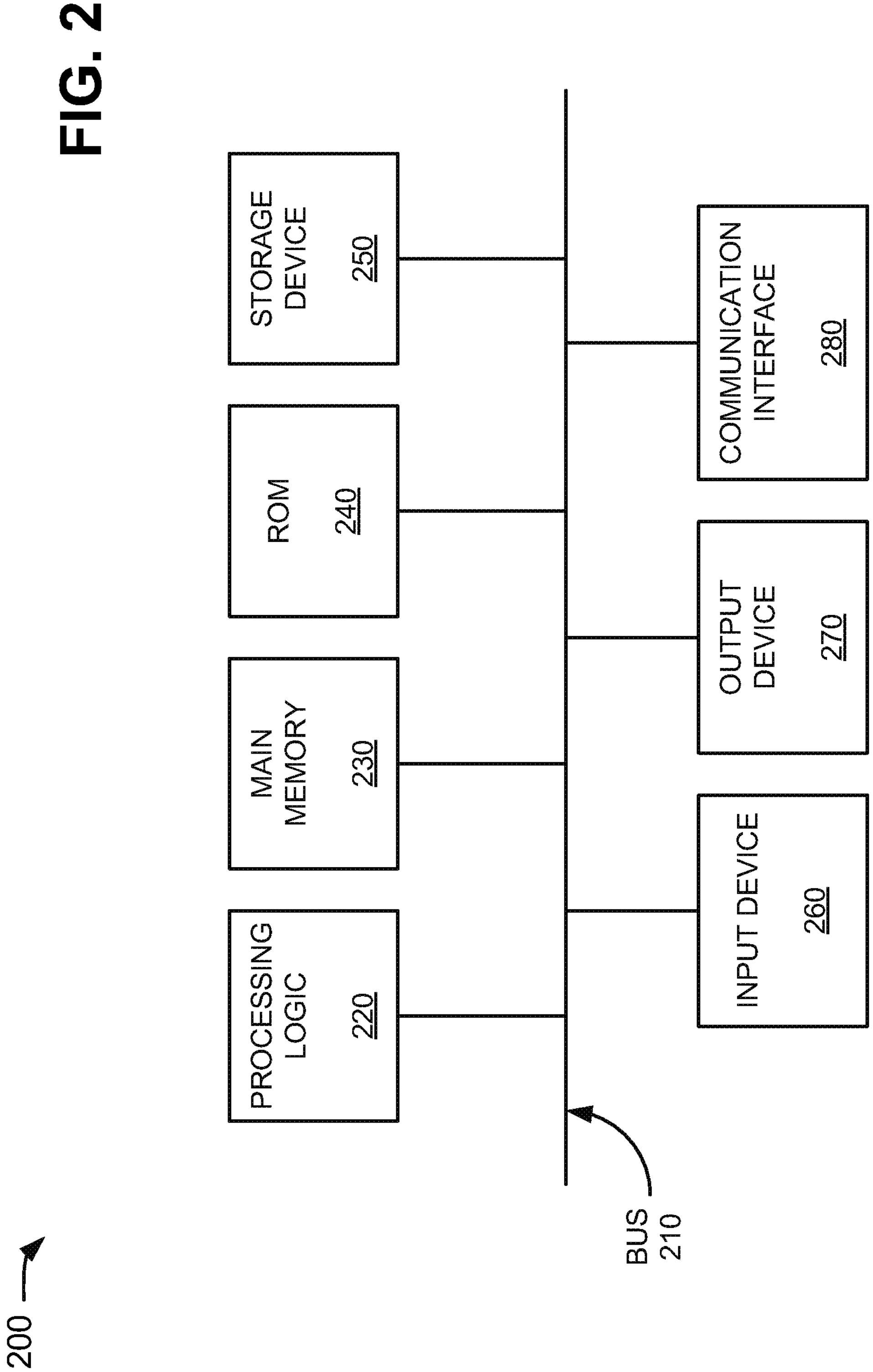
FIG. 2 illustrates exemplary components of a set-top box (STB), television, service provider, and/or user device of the network depicted in FIG. 1.

FIG. 2 is an exemplary diagram of a device 200 that may correspond to any of STB 120, service provider 140, and/or user device 150. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 160.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than those depicted in FIG. 2. In still other implementations, one or more components of device 200 may perform one or more other tasks described as being performed by one or more other components of device 200.

Figure 3:
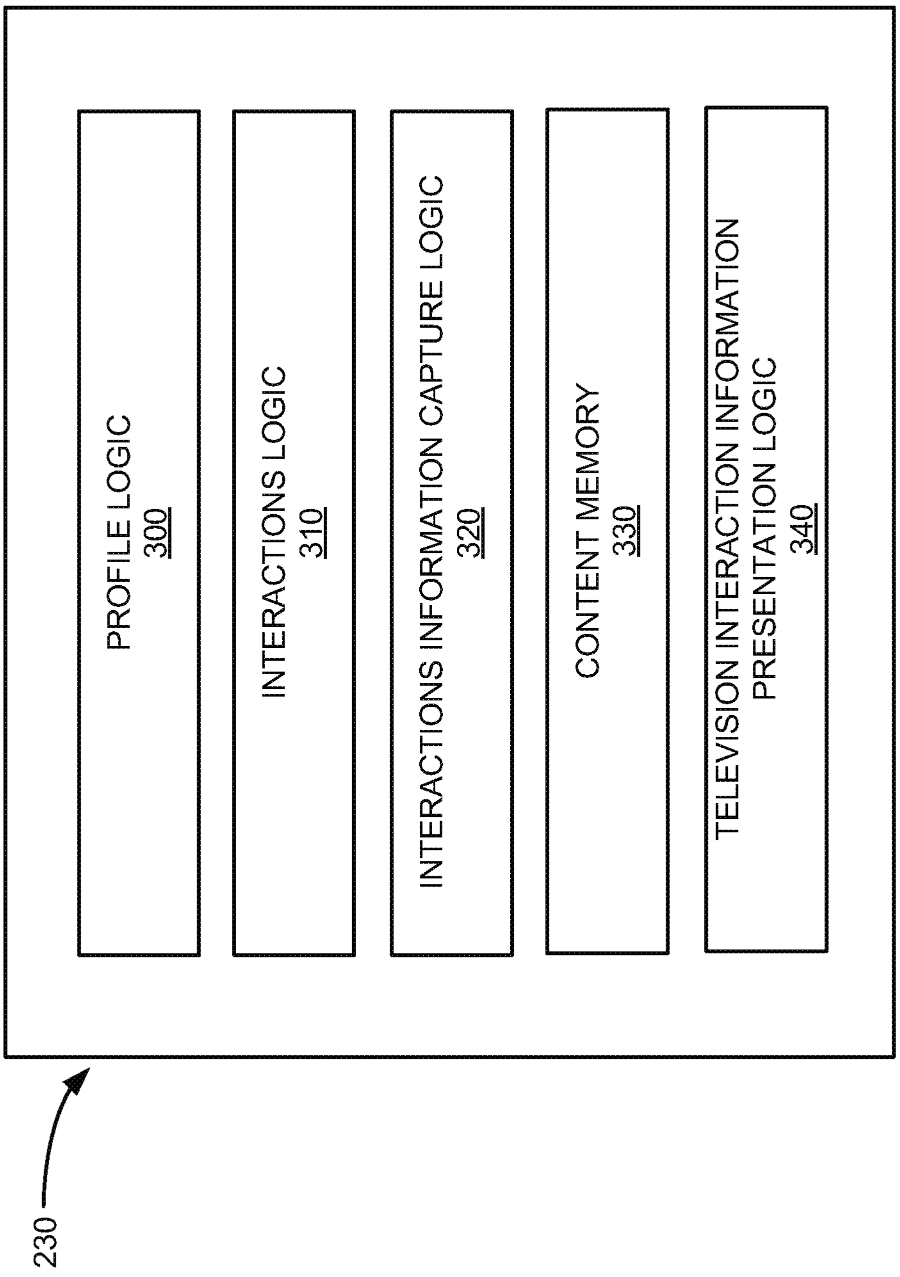
FIG. 3 is an exemplary functional block diagram of components implemented in the STB of FIG. 1.

FIG. 3 is an exemplary functional block diagram of components implemented in STB 120 and/or television 110 of FIG. 1. In an exemplary implementation, all or some of the components illustrated in FIG. 3 may be stored in memory 230. For example, referring to FIG. 3, memory 230 may include profile logic 300, interactions logic 310, metadata capture logic 320, content memory 330, and television interaction information presentation logic 340. In addition, various logic components illustrated in FIG. 3 may be implemented by processing logic 220 executing one or more programs stored in memory 230. In some implementations, one or more components of FIG. 3 may be implemented in other devices, such as service provider 140.

Profile logic 300 may include may include logic configured to receive information corresponding to monitoring or capturing television interaction information associated with one or more users and user devices (e.g., television 110, STB 120, user device 150, etc.). For example, profile logic 300 may be configured to receive profile information from one or more users of the STB 120, such as an account holder associated with STB 120 and a number of other users associated with STB 120 and/or user device 150. For simplicity, the following description refers to the account holder or master user as the "super user" and to other users as "child users." In some implementations, the profile information may be received via an interface (e.g., a graphical user interface) associated with STB 120. In other implementations, the profile information may be received via an interface, e.g., a web-based interface associated with service provider 140.

Exemplary profile information may include entries for each user associated with an account (e.g., in a household) or device (e.g., STB 120). Each entry may include at least identifier information, authentication information, avatar or icon information, mobile device information, and permissions information. By associating individual users with a television account or with television-related devices (e.g., STB 120), interactions by the users with the account and/or devices may be tracked to provide a better understanding of account usage and preferences.

FIG. 4 illustrates a structure of an exemplary database 400 for storing profile information received by profile logic 300.

Database 400 may be stored in content memory 330. Referring to FIG. 4, database 400 may include a number of user entries 405-1 to 405-4 (collectively "entries 405" or individually "entry 405"). Each entry 405 in database 400 corresponds to a user associated with a particular account. Although only a single account is depicted in database 400 it should be understood that, in some implementations, database 400 may include information for a number of accounts, each including a number of user profiles. In such an instance, database 400 may be stored on a remote, networked device associated with service provider 140.

In an exemplary embodiment, each profile entry 405 may include a user name field 410, a profile number field 411, an administrator identifier (Admin) field 412, an authentication information field 415, an avatar field 420, a mobile number field 425, a schedule field 430, a delete field 435, and a modify field 440. As described above, profile logic 310 may receive or otherwise obtain metadata information corresponding to interactions between account users and television 110, STB 120, and/or service provider 140, and use the obtained metadata information to provide values for fields 410-440 in entries 405. Additionally, each field 410-440 in entries 405 may include a plurality of fields or sub-fields. For example, in other implementations, fields 430-440 may be sub-fields of a single permissions parent field.

User name field 410 may include an identifier, such as an alphanumeric character string associated with a particular user. For example, as shown in FIG. 4, entries 405-1 to 405-4 include user names of "Bobby," "Dad," "Mom," and "Susie." Profile number field 411 may include a numerical identifier associated with the user of the account. As illustrated in FIG. 4, Dad may be associated with profile number 1, Mom may be associated with profile number 2, Bobby may be associated with profile number 3, and Susie may be associated with profile number 4.

Admin field 412 may include information indicating whether the user is an administrator. For example, admin fields 412 for users Dad and Mom include positive administrator indicators, while admin fields 412 for users Bobby and Susie include negative administrator indicators. A positive administrator indicator may enable the associated user to make account-related changes or view information associated with other users, while a negative administrator indicator may not provide these features to the associated user.

Authentication information field 415 may include authentication information associated with the user. In some implementations, the authentication information may include password information. In other implementations, the authentication information may include biometric information, such as voice recognition information (e.g., a voice print), hand, palm, vein, or finger print information, retinal or iris information, etc. In one exemplary embodiment, the biometric information may be received from the user via a biometric interface associated with remote control 130.

Avatar field 420 may include information relating to avatars or graphical representations associated with the user. For example, information included in avatar field 420 may include a file identifier associated with a graphics file, such as a jpeg or png image file. In some implementations, each avatar field 420 in profile database 400 may include a default avatar value that may be modified by a user or super user associated with the account. As will be described in additional detail below, the graphical element associated with the identifier in avatar field 420 may be used to provide easier identification of user activity, such as an identification of what user's performed what actions.

Consistent with embodiments described herein, the image files associated with the avatar information may be selected (e.g., uploaded) by a user or may be selected automatically by profile logic 300. The profile icon may be used in the manner described below, to relate presented television interaction information with user(s) associated with a particular profile. In other implementations, the presented television interaction information may be associated with a particular profile by using a user name (e.g., from field 410) or assigned profile identifier (e.g., from field 411).

Mobile number field 425 may include identification information corresponding to user devices. For example, mobile number field 425 may include 10 digit telephone numbers associated with user device 150 used to make programming selections, purchase media, schedule recordings, e.g., on STB/DVR 120. In other implementations, mobile number field 425 may include other types of device identification information, such as a device's electronic serial number (ESN), International Mobile Equipment Identifier (IMEI), Mobile Equipment Identity (MEID) number, or Mobile Identification Number (MIN).

Schedule field 430, delete field 435, and modify field 440 may include information relating to permission or authorization information associated with a particular user. For example, schedule field 430 may indicate whether the particular user is authorized to schedule recordings. Delete field 435 may indicate whether the particular user is authorized to delete programs or content (either, yes, no, or "own," referring to recordings or purchases made by that user). Modify field 440 may indicate whether the particular user is authorized to modify programming or content. "Modifying content" may refer annotating or otherwise editing content.

It should be understood that the profile fields described above are exemplary and that any other suitable types of information may also be included within profile database 400, such as authorized ratings information, authorized content type information, cost limitation parameters, etc.

Returning to FIG. 3, upon activating television 110 and/or STB 120, users may be required to select a profile and to log in or otherwise authenticate themselves with the selected profile. For interactions with service provider 140, television 110 and/or STB 120 initiated via user device 150, the identification information associated with user device 150 may identify the user.

In some implementations, the profile information may be explicitly received from a user, such as the super user. For example, profile logic 300 may provide an interface (e.g., via an on screen display (OSD), web server, interactive voice response system, call center, etc.) for receiving television interaction profile information from a user. Such an interface may query the user for additional television interaction profile information based on information that has been previously submitted. For example, in an OSD implementation, an initial set of questions may provide for setting up the television interaction profile, requesting information such as the age (or age group) of the person being monitored, etc. Follow-up questions that are tailored based on responses to the initial set of questions may then be presented. For example, when an age that is associated with being a minor has been entered, the user may be subsequently queried about capturing adult-themed content information (e.g., based on rating, description, channel, etc.).

In some implementations, television interaction profile information may include only a name (e.g., a name of an individual user associated with the profile) or a number designating a member in a group (e.g., a designation associated with a group of users, e.g., "family," or "kids"), whose member's profile information is being captured and stored. An authorized user (e.g., the super user) may review the information collected for each established profile.

Interactions logic 310 may include logic configured to receive interaction requests from a user in the profile database and may perform processing associated therewith. In one implementation, interactions logic 310 may receive a service request (e.g., a program or content scheduling, purchasing, or modification request) from a user via, e.g., interactions with STB 120, television 110, or one or more user devices 150. For example, user may submit the scheduling request via an interface or application on user device 150 (e.g., a mobile telephone or PDA). The user may log in or otherwise identify oneself to service provider 140 or STB 120 and may submit a program recording request for one or more STBs 120 via the interface.

Subsequently, interactions logic 310 may receive the service request from service provider 140 via network 160 along with identification information corresponding to the user. Interactions logic 310 may compare the request to the profile entry (e.g., entry 405) associated with the user, and may determine whether the requested service is authorized, or whether rendering the requested service would result in an event not authorized for the user (such as deletion of another prior recording, etc.). If the requested service is allowed, interactions logic 310 may provide the requested service.

In another example, interactions logic 310 may receive a purchase request (such as a video on demand (VOD) or pay-per-view (PPV) purchase request, a widget, game, or application request) from a user via remote control 130. Interactions logic 310 may compare the request to the profile entry (e.g., entry 405) associated with the user, and may determine whether the requested purchase is authorized. If the requested purchase is authorized, interactions logic 310 may initiate the requested purchase, such as by downloading the content, installing the application, etc.

In still another example, interactions logic 310 may receive a program or other content deletion request via a web interface associated with service provider 140. Interactions logic 310 may compare the requested deletion to the profile entry (e.g., entry 405) associated with the user, and may determine whether the requested deletion is authorized.

Interactions information capture logic 320 may be associated with interactions logic 310 and may include logic configured to capture, receive, or otherwise obtain data relating to television interactions monitored or performed by interaction logic 310. In some implementations, interactions information capture logic 310 may be configured to capture and store information associated with television content as it is viewed on, e.g., television 110 along with information relating to the user initiating the viewing. For example, upon receipt, by interactions logic 310, of a request to schedule a program recording on STB 120, interactions information capture logic 320 may store information relating to the user scheduling the recording, the program being recorded, and the manner in which the request has been made, e.g., via STB 120, via a mobile device, etc. In another example, in response to a PPV request received by interactions logic 310, interactions information capture logic 320 may capture and store information relating to the user making a purchase, the time/date the purchase is made, information relating to the PPV content purchased, and the manner in which the request is made. In some embodiments, interactions information capture logic 320 may also store information describing the viewing status of the purchased content, such as previously viewed, partially viewed, not viewed, etc., and the dates/times corresponding to the viewing(s).

The captured information may be updated upon a change in the status of the interaction or content. For example, a transition from a scheduled recording status to a current recording status, etc. may be reflected in the captured information.

In one exemplary implementation, STB 120 may be configured to periodically receive content description information (referred to herein as "program guide information") from service provider 140 (e.g., a broadcaster, cable company, etc.) relating to television programming available for viewing. The received program guide information may include scheduling and descriptive information relating to content to be received by STB 120 at predetermined time intervals. For example, STB 120 may receive updated program guide information on an hourly or daily basis.

The program guide information may be provided to a user, upon command, as a program guide or menu. In one implementation, the program guide may include a generally grid-like arrangement of the program guide information corresponding to selected time slots. A selection of a particular program displayed in the program guide may result in STB 120 "switching" to the selected channel, or, for future programming, may query the user whether the user wishes to set STB 120 to change channels at the program time, or record the program via STB 120's DVR functionality.

In one implementation, the received program guide information may include associations between channel identifiers, scheduled programs, and scheduling data. For example, the received program guide information may include an entry indicating that "Judge Judy" is broadcast on channel 404 from 4:00 PM to 4:30 PM on Mar. 3, 2009. The program guide information entry may also include additional program information, such as genre, rating, a brief plot synopsis, etc. STB 120 may store this information e.g., in a table or other suitable memory structure. In the event that a user has viewed or recorded channel 404 for at least part of the identified time slot, STB 120 may indicate that the user has watched at least a portion of the "Judge Judy" program. For recorded content, the program guide information corresponding to the recorded program may be stored and associated with the recorded program, in order to provide identification information to the user.

Consistent with embodiments described herein, interactions information capture logic 320 may be configured to track or otherwise capture the program guide information associated with viewed or scheduled programming, the times, durations, and the manners in which the programming has been viewed, information associated with the user (obtained from the profile database) viewing or scheduling the content. For example, assume that a user authenticated as "Bobby" has submitted a request to view a particular channel, either by direct input (e.g., via a remote control 130) or by user interaction with the program guide interface. Interactions logic 310 in STB 120 may determine, based on the profile entry associated with Bobby, whether Bobby is authorized to view content on the selected channel and, if so, may navigate to the selected channel. Interactions information capture logic 320 may store information associated with the content from the program guide information and may also store information regarding the user viewing the content and the manner in which the viewing request was made.

In another example, assume that a user account with a service provider 140 includes two or more STBs 120. For example, the user may have a first STB 120 connected to a first television 110 in the basement, a second STB 120 connected to a second television 110 in the family room, and a third STB 120 connected to a third television 110 in the bedroom. Consistent with embodiments described herein, interactions information capture logic 320 may be configured to capture information regarding viewed content across all STBs 120 associated with a user account. In this information, each STB associated with the account may be provided with a STB identifier, such as an alphanumeric identifier. In some instances, the STB identifiers may include descriptive names for each STB, indicative of the STB's location, such as "family room," "master bedroom," etc.

In addition, two or more of STBs 120 may be configured to provide multi-room recording or multi-room DVR. Multi-room DVR refers to a feature in which two or more STBs 120 receive the same user commands to control viewing the same content. For example, assume that a user watches a portion of recorded content in one room (e.g., via a first STB 120). The user may then stop playback of the programming content on the first STB 120 and, at some point in the future, continue playback of the programming on a second STB 120 associated with the user's account, picking up where the user stopped watching at the first STB 120. In other words, DVR content recorded and stored on a particular STB 120, but playback of the content may not be limited to the STB 120 on which it is recorded. Rather, the content may be synchronized across multiple STBs 120 (e.g., streamed or otherwise transmitted to other STB's 120) associated with the user's account. In some implementations, such STBs 120 may be geographically distant from each other. In this implementation, interactions information logic 320 may be further configured to capture information relating to multi-room DVR viewing, such as location identifiers relating to where the content is viewed, percentages of time viewed in each location, etc.

In addition to program guide information and related television content, STB 120 may be configured to provide an interactive platform to users for engaging in non-television content activities. Exemplary non-television content activities may include interacting with widgets, playing games, engaging in shopping services, etc.

The term "widget" generally refers to a software application, typically small in size, configured to provide a defined function or type of information. Exemplary widgets may include weather widgets for tracking weather conditions, stock widgets for tracking financial stocks or markets, news widgets, for facilitating the display and presentation of news, etc. Provided widgets may retrieve information from remote sources via, for example, network 160. STB 120 may enable users to select from and interact with a number of widgets. Games may include network-based games, e.g., web games that retrieve game content via network 160. Alternatively, games may include software applications stored, e.g., in storage device 250 of STB 120. Shopping services may include any component of STB 120 that enables users to order and/or pay for items, services, or content. For example, STB 120 may provide an interface for enabling users to purchase items from, e.g., service provider 140, or other vendors. Purchased items may include, for example, pay-per-view (PPV) and video-on-demand (VOD) content, flowers from local florists, pizza for delivery, etc.

Consistent with implementation described herein, information regarding these additional television-based activities may be captured and stored by interactions information capture logic 320 (e.g., in content memory 330) to provide a user or users with an accurate snapshot of how the account is being used. For example, widget and/or game use information may be captured and stored along with information relating to purchases or orders placed via television 110/STB 120. For web or Internet related information, a browsing history or other information may be captured and stored. The stored information may be associated with the profile information or a user that requested or performed the activity. In addition, information regarding the manner in which the television-based activities are initiated or content is viewed may also be captured.

Interactions information capture logic 320 may track information corresponding to users or profiles in a number of ways. For example, relating to television viewing content, viewing experience information may be tracked by storing user identification information, interaction origin information, and program guide information corresponding to the selected channel number and time slot, and the start time of the viewing as an entry in content memory 340. For content, either scheduled to be recorded or previously recorded, interactions information capture logic 320 may store user identification information, interaction origin information, and program guide information associated with the scheduled or previously recorded content.

In some implementations, interactions information capture logic 310 may also store a stop time in the entry corresponding to the content. The start and stop times may be used to calculate total viewing times during subsequent reporting or a review of an interaction history associated with the user's account. In one exemplary implementation, content viewing or interactions for a period of time below a defined threshold, such as one or two minutes, may be disregarded to account for channel surfing behaviors, mis-entered channel numbers, etc.

For purchase or ordering-related services, interactions information capture logic 320 may capture information that includes a description of the item(s)/service(s) being purchased, the time/date of the purchase, and payment information (e.g., credit card, debit card, account charge, etc.) relating to the purchase. In addition, as described above, information capture logic 320 may also capture user and interaction origin information corresponding to the purchases.

For web or Internet-related interactions, interactions information capture logic 320 may capture information that includes web address information (i.e., uniform resource locator (URL)), time/date information, etc. For gaming, interactions information capture logic 320 may capture game title, level-related information in the game, opponent information, etc.

As described briefly above, in addition to information relating to the content or services being used, interactions information capture logic 320 may also capture and store information relating to the origin of the interaction on service/content. For example, a pay-per-view movie may be ordered via a web interface associated with service provider 140, or via user device 150 (e.g., a cell phone) interacting with STB 120 and/or service provider 140. Similarly, a television program may be scheduled via user interface 150. In the manner described below, this information may be stored along with the corresponding content information.

Content memory 330 may include one or more memories, such as a hard disk drive (HDD), solid state drive (SSD), random access memory (RAM), read only memory (ROM) or another memory that stores the above-described interactions information upon capture by interactions information capture logic 320. For example, in one implementation, content memory 330 may include one or more databases of entries corresponding to profile information and captured interactions information. As described above, profile database 400 may include entries corresponding to users associated with STB 120 or an account associated with STB 120. Relating to captured interactions information, content memory 330 may include a database or other data structure having entries that include a profile identifier corresponding to a user in profile database 400, origin information indicating the origin or manner in which the content request or interaction was made, content name, content description, type, start time, stop time, and duration of the interaction. The database may store additional types of captured information, including, for example, genre, rating, actor names, director names, producer identifications, the current level in a game, channel identifier, etc., as well as graphical elements, such as channel logos, movie posters, game screenshots, etc.

Further, for accounts having more than one STB 120, captured interactions information may include an STB identifier, or more than one identifier for multi-room DVR content. The stored interactions information may facilitate reviewing of the information and/or reporting at a later time, as described in detail below. Additionally, the captured and stored information may be monitored and tracked for generating alerts or notifications, such as parental notifications. Still alternatively, the captured and stored information may be monitored for access control or limits on content, for a particular profile. For example, profile information may indicate that a user is allowed to view three PPV movies per month. Upon passing this limit, additional PPV requests may be denied. In some implementations, this functionality may be incorporated into interactions logic 310 described in detail above. In some implementations, content memory 330 may also include data structures for storing recorded television content, program guide information, or other content, such as downloaded applications, widgets, etc.

Although illustrated as part of STB 120 or television 110, in an alternative implementation, content memory 330 may include a memory structure remote from STB 120 or television 110, such as a remote database, server device, or the like. For example, content memory 330 may be stored at a remote server configured to periodically receive television interaction information from STB 120 via a network, such as network 160.

Figure 5:
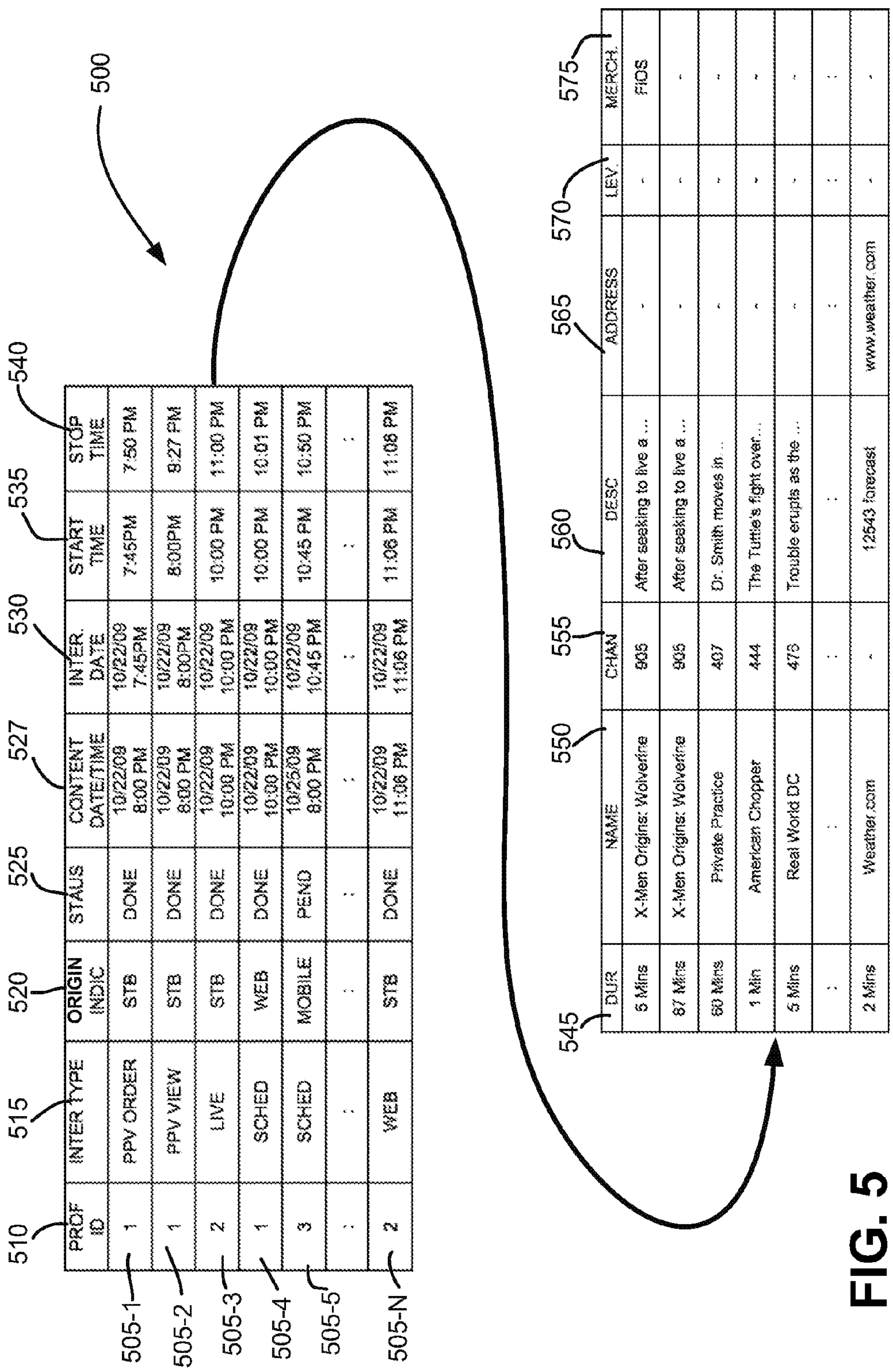
FIG. 5 illustrates a structure of an exemplary database for storing interactions information captured by the interactions information capture logic of FIG. 3.

FIG. 5 illustrates a structure of an exemplary database 500 for storing captured television interaction information received by interactions information capture logic 320. As described above, database 500 may be stored in content memory 330 and may include a number of entries 505-1 to 505-N (collectively "entries 505" or individually "entry 505"). Each entry 505 may correspond to a particular interaction for which information has been captured. In one implementation, database 500 may include interaction information associated with a number of user profiles associated with a particular account (e.g., a household).

In an exemplary embodiment, each interaction entry 505 may include a profile identifier field 510, an interaction type field 515, an origin indicator field 520, a status field 525, a content time/date field 527, an interaction date field 530, a start time field 535, a stop time field 540, a duration field 545, a name field 550, a channel field 555, a description field 560, an address field 565, a level field 570, and a merchant field 575. As described above, interactions information capture logic 320 may receive or otherwise obtain information corresponding to interactions between account users and television 110, STB 120, and/or service provider 140. Additionally, each field 510-580 in entries 505 may include subfields.

Referring to FIG. 5, profile identifier field 510 in database 500 may include an identifier associated with a user entry in, e.g., profile database 400. For example, for an interaction associated with user "Dad," profile identifier field 510 may include a value of "1." The value of profile identifier field 510 may enable entries in database 500 to be linked or otherwise associated with corresponding entries in database 400. As will be described in additional detail below, profile information from database 400 may be used to present interactions information to a user. Interaction type field 515 may include information corresponding to the type of interaction performed. Exemplary interaction types may include viewing live television, scheduling a recording, deleting a recording, viewing recorded content, purchasing a game, playing a game, purchasing VOD/PPV, viewing VOD/PPV, purchasing/downloading widget, widget user, etc. In some implementations consistent with embodiments described herein, available interaction types may be more or fewer than those illustrated, depending on the scope of captured information.

Origin indicator field 520 may indicate the manner in which the interaction was received or initiated. For example, an origin indicator field value of "STB" may indicate that the interaction was received via STB 120, an origin indicator field value of "WEB" may indicate that the interaction was received via a web interface, an origin indicator field value of "MOBILE" may indicate that the interaction was received via a mobile device, such as user device 150, etc.

Status field 525 may indicate a current status of the interaction or request. For example, status field 525 value of "scheduled" may indicate that the activity (e.g., a program recording) has been scheduled, "recorded" may indicate that the scheduled recording has been completed, "downloaded" may indicate that a purchased or downloaded item has program has been received, etc.

Interaction date field 530 may identify the date on which the interaction occurred. Start time field 535 may indicate the time when viewing of the content started (e.g., 7:50 PM, 4:05 PM, etc.). In some implementations, multiple viewings of a single content (i.e., program) may be captured in different content viewing entries 505. Alternatively, a single viewing entry 505 corresponding to the single content may be updated to reflect multiple viewing sessions, e.g., by including multiple start times in start time field 535. Stop time field 540 may include a value indicating when viewing of the content stopped. For multiple viewing sessions of a single content, stop time field 540 may include multiple stop times, each stop time corresponding to a start time in start time field 535. Duration field 545 may include a value corresponding to the total viewing time for the content. The value in duration field 545 may be calculated based on the value(s) in start time field 535 and stop time field 540.

Name field 550 may include the name or title of the content. Channel field 555 may include information corresponding to the channel number of the content. Description field 560 may include a description of the content in the program guide. Typically, the description may include a short plot synopsis of the content. Address field 570 may include a URL or other address element associated with the content. Level field 575 may include level information associated with a game. Merchant field 580 may include a merchant name or identifier associated with a shopping.

Returning to FIG. 3, television interaction information presentation logic 340 may include logic configured to receive a request for television interaction information. For example, television interaction information presentation logic 340 may receive a request to view a listing of scheduled or recorded programs on STB 120. As will be described in additional detail below, the request for television interaction information may be received via a graphical user interface (GUI) associated with STB 120 and/or television 110. In other implementations, the request for television interaction information may be received from user device 150, via network 160.

In some implementations, television interaction presentation logic may determine whether the request for information is received from an authorized user, e.g., the super user or a household adult (e.g., based on the authentication information received during user login), and may present different types of information accordingly.

In one exemplary implementation, television interaction information presentation logic 340 may include a web server application configured to provide a web interface for facilitating receipt of the request for television interaction information via network 160 or other suitable data network. As described above, in some implementations, television interaction information presentation logic 340 may be associated with service provider 140, such that information stored in content memory 330 is provided to a remote resource associated with service provider 140. In such implementations, service provider 140 may receive and respond to requests for television interaction information provided from content memory 330.

Regardless of the manner in which a request for television interaction information is received, in some implementations, television interaction information presentation logic 340 may determine whether the request has been received from an authorized user prior to providing the television interaction information. Further, when television interaction information presentation logic 340 determines that the request has been sent from an authorized user, television interaction information presentation logic 340 may provide television interaction information in a variety formats.

In some implementations, the television interaction information may be provided for an identified user or users associated with the account, e.g., users Dad and Mom in profile database 400. Alternatively, the television interaction information may be provided for all users associated with profile database 400. In still other implementations, all users associated with profile database 400 may be provided with a subset of possible television interaction information, but only authorized users may be provided with detailed television interaction history information.

As discussed above, the display of television interaction information may be based on the retrieved interactions information stored in content memory 330. This information may be presented via, for example, in a number of different manners, such as in a chronological list view, a timeline view, a hierarchical view, etc. For example, the television interaction information may be presented in a list view that lists the interactions associated with a user account for a particular period of time, e.g., for the next week. In some implementations, the list may be sorted chronologically, while in other implementations, the list may be sorted by content type (e.g., live television programming, DVR programming, scheduled recordings, widgets, web activity, etc.).

Figure 6:
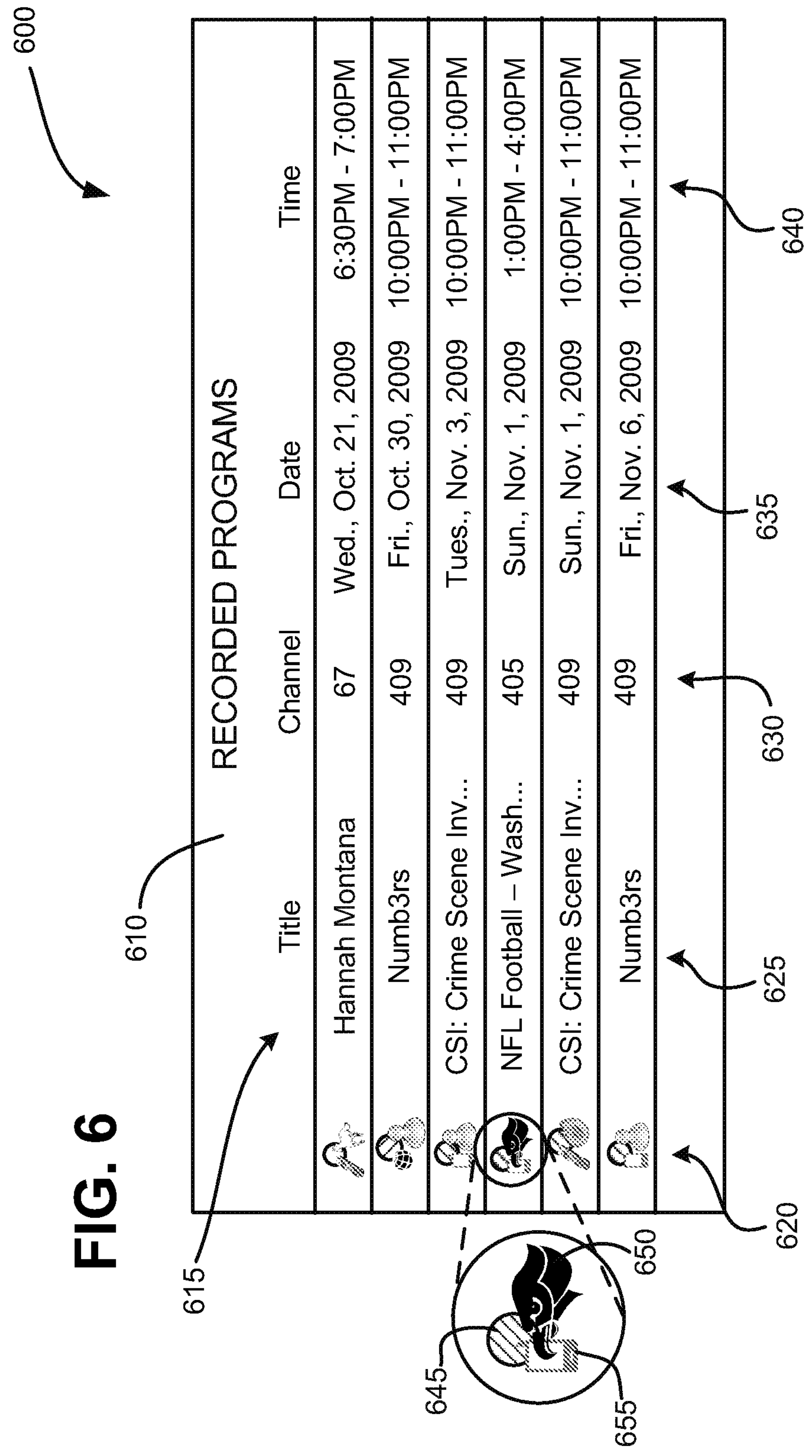
FIG. 6 is a diagram of an exemplary user interface capable of being generated by the STB and/or the service provider of the network illustrated in FIG. 1.

FIG. 6 illustrates a diagram of an exemplary user interface 600 capable of being generated by television 110, STB 120, and/or service provider 140 (e.g., and displayed via television 110 or user device 150). User interface 600 may be generated by television interaction information presentation logic 340 and may display interactions and profile information stored by content memory 330. User interface 600 may include a graphical user interface (GUI) or a non-graphical user interface, such as a text-based interface. User interface 600 may provide information to users via a customized interface (e.g., a proprietary interface) and/or other types of interfaces (e.g., a browser-based interface, a television interface, etc.). User interface 600 may receive user inputs via one or more input devices (e.g., input device 260) and may be user-configurable (e.g., a user may change the size of user interface 600, types of information displayed in user interface 600, color schemes used by user interface 600, positions of text, images, icons, windows, etc., in user interface 600, etc.). User interface 600 may be displayed to a user via one or more output devices (e.g., output device 270).

As illustrated in FIG. 6, user interface 600 may include a recorded programs screen 610. Recorded programs screen 610 may include a listing 615 of recorded or scheduled programs. For each listed program, listing 615 may include a number of graphical and/or textual elements, including an indicator icon 620, program title 625, channel 630, date 635, and time 640. Consistent with implementations described herein, indicator icon 620 may incorporate multiple elements of stored interaction information. For example, indicator icon 620 may include a status element 645, a user avatar element 650, and an origin indicator element 655.

As illustrated, status element 645 may include an icon or other element indicative of a status of the program or associated content. For example, status element 645 in interface 600 may include a patterned or colored circle or other geometric shape, with different colors or patterns representing different statuses. In one implementation, a green color (represented as a solid pattern in FIG. 6) may represent a successfully recorded program, a yellow color (represented as a left cross-hatched pattern in FIG. 6) may represent a pending recording, and a red color (represented as a right cross-hatched pattern in FIG. 6) may represent a failed or stopped recording (e.g., a recording stopped early due to lack of recording space). During generation or display of interface 600, television interaction information presentation logic 340 may retrieve status information from status information field 525 of television interaction information database 500.

User avatar element 650 may include a graphical element representative of a particular user, e.g., a user identified in profile database 400. As described above, during user profile creation, an avatar file may be designated for or associated with each user. Inclusion of user avatar element 650 in interface 600 may enable a user that is viewing interface 600 to quickly and easily ascertain the identity of the user that initiated program or content.

Origin indicator element 655 may include an icon or graphical element representative of the manner in which the interaction was received or initiated. As described above, origin indicator information may be stored in television interaction information database 500 and may be retrieved by television interaction information presentation logic 340 during generation or display of interface 600. In one exemplary implementation, interactions initiated by remote control 130 may be represented by a remote control icon, interactions initiated by a mobile user device (e.g., user device 150) may be represented by a mobile telephone icon, and interactions initiated via a web interface associated with service provider 140 or STB 120 may be represented by a globe icon.

For each listed program or content element in listing 615, program title element 625 may include the program title information retrieved from television interaction information database 500, channel element 630 may include the channel number information retrieved from television interaction information database 500, date element 635 may include the program or content date information retrieved from television interaction information database 500, and time element 640 may include the program time information retrieved from television interaction information database 500.

In the above, exemplary interface 600 relates to a listing 615 of recorded or scheduled programs. However, similar interfaces may be provided for displaying or presenting any combination of information retrieved from television interaction information database 500 and/or profile database 400. Exemplary collections of information may include purchase history information, PPV/VOD ordering/viewing information, content-type viewing information, web history information, game play information etc.

In another implementation consistent with embodiments described herein, television interaction information presentation logic 340 may be integrated with program guide logic associated with STB 120 and may insert or otherwise indicate interaction information into a displayed program guide. For example, a program guide graphically depicting upcoming programming for a particular time period may be modified to reflect scheduled recordings based on the captured interaction information. In some implementations, indicator icon 620 may be included in or otherwise integrated with the program guide data to illustrate when a program has been scheduled for recording, who has scheduled the recording, and the origin of the interaction.

Figure 7:
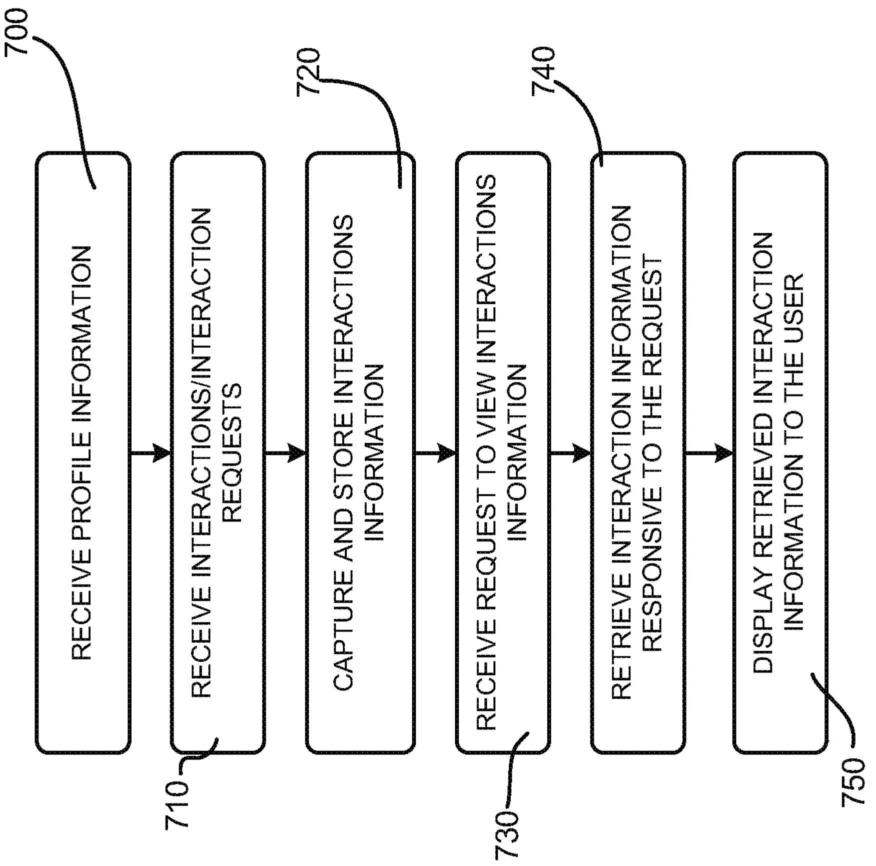
FIG. 7 is a flowchart of exemplary processes according to implementations described herein.

FIG. 7 is a flow diagram illustrating exemplary processing associated with television interaction information presentation logic 340. Processing may begin with STB 120 (and/or television 110 or service provider 140) (e.g., profile logic 300) receiving profile information associated with a user account (block 700), e.g., from an authorized user associated with STB 120. As described above, exemplary profile information may include login and identification information for each user associated with the account with which STB 120 is associated. For example, each user associated with the account may submit user name, authentication information, and/or avatar information. Furthermore, permission-related information associated with each user may also be received. Although it is envisioned that the established profiles may be used for different purposes, such as restricting channels that a user (e.g., a non-super user) may access, restricting the user's access times, modifying content preferences, program guide preferences, etc., for the purposes of this description, the profiles may be established to facilitate subsequent review of viewing history associated with particular users identified in the profiles.

Once one or more profiles have been established, STB 120 may receive interactions or interaction requests from users (block 710). For example, a user may schedule a television program for recording by DVR functionality in STB 120 via interactions logic 310. In other examples, service provider 140 associated with STB 120 may receive the interaction request, such as a request to order a PPV movie via a mobile user device 150. In this implementation, service provider 140 may forward the request to STB 120, which may render or perform the requested service or operation. In still other implementations, STB 120 may directly interact with mobile user device 150, such as via a local wireless network associated with STB 120.

STB 120 may capture and store information regarding the received interactions or interaction requests (block 720). For example, in one implementation, information such as the type of interaction, the origin of the interaction, identification information associated with the user involved in the interaction, interaction metadata, such as title, content type, etc. may be captured and stored, e.g., in interactions information database 500 in content memory 330.

STB 120 (or service provider 140 associated with STB 120) may receive a request to view television interaction information (block 730). In one implementation, various interaction information requesting or reporting options may be provided in a menu of choices available to a user of STB 120, such as a viewing history request, a recorded programs listing request, a PPV/VOD order history request, etc. As described briefly above, users may be allowed to review television interaction information associated with STB 120. In this manner, menu choices available to users may be dynamically modified to reflect the choices available based on the profile under which the user signed into or logged into STB 120. In one implementation, the request to view television interaction information may designate a particular user profile, such as a request for a list of interactions performed by a particular user. In other implementations, television interaction information for all user profiles associated with STB 120 or the account with which STB 120 is associated may be made available.

In response to the receipt of the request to view television interaction information, STB 120 (e.g., television interaction information presentation logic 340) may retrieve television interactions information (e.g., from content memory 330) associated with the user profile (or profiles) relating to the request (block 740). For example, television interaction information presentation logic 340 may retrieve information relating to the requested view from interactions information database 500 and profile database 400.

In one implementation, television interaction information presentation logic 340 may be configured to provide television interaction information for a default or predetermined time interval, such as for the current week. In other implementations, prior to retrieving the television interaction information, television interaction information presentation logic 340 may query the user for a time interval in which the requested television interaction information has been collected.

Television interaction information presentation logic 340 may display the retrieved television interaction information to the user (block 750). As described above, television interaction information may be displayed in a variety of manners based on user preferences, default settings, explicit requests, etc. For example, television interaction information presentation logic 340 may be configured to provide a viewing history overview screen or other default information view. The viewing history overview screen may provide a high-level breakdown of the viewing history associated with particular users identified in the profile database, e.g., database 400. For example, the viewing history overview screen may textually or graphically (e.g., via charts, graphs, icons, etc.) illustrate television content viewed or purchased during a selected time interval. During account setup or as a preference setting in STB 120, the user may specify the default format of the viewing history overview screen, for example, to be based on content type, content genre, content rating, etc.

As described in detail above in relation to FIG. 6, the displayed television interaction information may include iconography that includes graphical elements designed to relay information relating to the interactions in an easy to understand manner. For example, each piece of interaction information provided by television interaction information presentation logic 340 may include indicator icon 620 that includes graphical elements representative of interaction status, the user associated with the interaction, and the origin of the interaction.

Implementations described herein relate to devices, methods, and systems for facilitating the storing and reviewing television interaction information. In some implementations, a STB or television may include components configured to capture interaction information associated with viewed, scheduled, or purchased television content. Upon receiving a subsequent request, the captured interaction information may be retrieved and presented to a user in a number of different formats, including graphical iconography designed to provide easy to understand interaction information to the requesting user.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to an STB or television performing interaction information capture and subsequent review functions. In other implementations, features described herein may be implemented mainly in one or more devices remote from the STB or television, such as by a remote server application or device (such as service provider 140).

Further, while series of blocks have been described with respect to FIG. 7, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:

receiving identification information associated with each of one or more users;

receiving interactions from the one or more users relating to content displayed on a television device;

capturing interaction information associated with the interactions, wherein the interaction information for one of the interactions includes at least;

interaction type information identifying a type of action associated with the interaction, interaction status information identifying a status of the interaction, wherein the status information indicates whether the interaction is completed, interaction origin information identifying a user device, of a plurality of user devices associated with the one or more users, that is used by the user to initiate the interaction, and user identification information identifying a user, of the one or more users, initiating the interaction;

dentifying profile information associated with the one or more users, wherein the profile information associated with each of the one or more users includes:

a user identification for the user, and a non-textual, graphical element representative of the user;

receiving a request to display at least some of the captured interaction information;

retrieving at least some of the captured information responsive to the request wherein the retrieved information relates to a first action, wherein the first action is initiated by a first user of the one or more users using a first user device, and wherein the first action is associated with a first status during a first time period;

determining, based on the profile information, a first graphical element associated with the first user;

modifying the first graphical element to include a first graphical indication associated with the first user device and a second graphical indication associated with the first status;

displaying at least a portion of the retrieved information and the modified first graphical element during the first time period;

determining a second status associated with the first action during a second time period that is after the first time period, wherein the second status is associated with a third graphical indication;

updating the modified first graphical element to form an updated first graphical element, wherein updating the modified first graphical element include replacing, in the modified first graphical element, the second graphical indication with the third graphical indication; and displaying the updated first graphical element during the second time period.

2. The method of claim 1, wherein the first graphical indication comprises an avatar associated with the first user.

3. The method of claim 1, wherein the second graphical indication is selected from a plurality of status elements based on the first status, and the third graphical indication is selected from the plurality of status elements based on the second status.

4. The method of claim 3, wherein the plurality of status elements include:

a done status element indicating that the interaction is completed, a pending status element indicating that at least a portion of the interaction is still occurring when the indicator icon is displayed, and a failed status element indicating that the interaction stopped before completion.

5. The method of claim 1, wherein the first graphical indication is selected from a plurality of origin indicator elements based on the retrieved information.

6. The method of claim 5, wherein the plurality of origin indicator elements includes:

a set-top box (STB) origin indicator element indicating that the interaction was initiated by an STB associated with the television device, a mobile origin indicator element indicating that the interaction was initiated by a mobile device, and a web origin indicator element indicating that the interaction was initiated by a computing device.

7. The method of claim 1, wherein the interaction type information includes at least one of:

content scheduling information indicating that the interaction relates to scheduling a viewing or a recording of the content, content viewing information indicating that the interaction relates to viewing the content by the user, or content purchase information indicating that the interaction relates to a purchase by the user.

8. The method of claim 1, wherein receiving the request to display at least some of the captured interaction information further comprises:

receiving a request to display a purchase history associated with the one or more users during a particular time period;

receiving a request to display a listing of recorded and scheduled content associated with the one or more users during the particular time period; or receiving a request to display a listing of content viewed by the one or more users during the particular time period.

9. The method of claim 1, wherein the television device is coupled to a set-top box (STB), wherein the captured interaction information is stored on a storage device remote from the television device or the STB, and wherein the request to display at least some of the captured interaction information is received at the remote storage device.

10. A device, comprising:

a communication interface that receives data associated with user interactions relating to television content, wherein the user interactions comprise actions by one or more users of the device with respect to the television content;

a memory that stores interaction information relating to the user interactions, wherein the interaction information for one of the user interactions includes:

interaction type information identifying a type of action associated with the user interaction, user identification information identifying a user, of the one or more users, performing the action associated with the user interaction, user device identification information identifying a user device, of a plurality of user devices associated with the user, that is used by the user to initiate the user interactions, and status information identifying a status of the user interaction, wherein the status information indicates whether the user interaction is completed, and store profile information associated with the one or more users, wherein the profile information associated with each of the one or more users includes:

a user identification for the user, and a non-textual, graphical element representative of the user;

an output interface that provides content for display; and a processor that receives a request to display at least some of the stored interaction information, retrieve, from the memory, at least some of the stored interaction information responsive to the request, wherein the retrieved information relates to a first action, wherein the first action is initiated by a first user of the one or more users using a first user device, and wherein the first action is associated with a first status during a first time period, determine, based on the profile information, a first graphical element associated with the first user, modify the first graphical element to include a first 2-raohical indication associated with the first user device and a second graphical indication associated with the first status, present for display, during the first time period, the retrieved information and the modified first graphical element via the output interface, determine a second status associated with the first action during a second time period that is after the first time period, wherein the second status is associated with a third graphical indication, update the modified first graphical element to form an updated first graphical element, wherein updating the modified first graphical element include replacing, in the modified first graphical element, the second graphical indication with the third graphical indication, and present for display, during the second time period, the updated first graphical element via the output interface.

11. The device of claim 10, wherein the graphical element comprises an avatar associated with the user.

12. The device of claim 11, wherein processor further selects the second graphical indication from a plurality of status elements based on the first status, and select the third graphical indication from the plurality of status elements based on the second status.

13. The device of claim 12, wherein the plurality of status elements include:

a done status element indicating that the interaction is completed, a pending status element indicating that at least a portion of the interaction is still occurring when the indicator icon is displayed, and a failed status element indicating that the interaction stopped before completion.

14. The device of claim 10, wherein the processor further selects the first graphical indication from a plurality of origin indicator elements based on the interaction information.

15. The device of claim 14, wherein the plurality of origin indicator elements includes:

a set-top box (STB) origin indicator element indicating that the interaction was initiated by an STB associated with the television device, a mobile origin indicator element indicating that the interaction was initiated by a mobile device, and a web origin indicator element indicating that the interaction was initiated by a computing device.

16. The device of claim 10, wherein the interaction type information includes at least one of:

content scheduling information indicating that the interaction relates to scheduling a viewing or a recording of the content, content viewing information indicating that the interaction relates to viewing the content by the user, or content purchase information indicating that the interaction relates to a purchase by the user.

17. The device of claim 10, wherein the processor further presents the retrieved information and the modified first graphical element for display via at least one of a television device or a set-top box (STB) that is remote from the device.

18. A non-transitory computer-readable medium having stored thereon sequences of instructions which, when executed by at least one processor, cause the at least one processor to:

receive identification information associated with one or more users;

identify interactions from the one or more users relating to content displayed on a television device, wherein the interactions relate to actions performed by the one or more users with respect to the content;

determine interaction information associated with the interactions, wherein the interaction information for one of the interaction includes:

interaction type information identifying one or more of the actions performed by a user, of the one or more users, in connection with the interaction, interaction status information identifying whether the interaction is completed, interaction origin information identifying a device used by the user to initiate the interaction, and user identification information identifying the user;

store the interaction information;

receive a request to display a portion of the interaction information;

retrieve the portion of the interaction information based on receiving the request, wherein the retrieved information relates to a first action, wherein the first action is initiated by a first user of the one or more users using a first user device, and wherein the first action is associated with a first status during a first time period;

determine, based on the profile information, a first graphical element associated with the first user;

modify the first graphical element to include a first graphical indication associated with the first user device and a second graphical indication associated with the first status;

present, during the first time period, the retrieved portion of the interaction information;

determine a second status associated with the first action during a second time period that is after the first time period, wherein the second status is associated with a third graphical indication;

update the modified first graphical element to form an updated first graphical element, wherein updating the modified first graphical element include replacing, in the modified first graphical element, the second graphical indication with the third graphical indication; and present for display, during the second time period, the updated first graphical element.

19. The non-transitory computer-readable medium of claim 18, wherein the interaction information further includes data identifying respective digital content associated with the interactions.

20. The non-transitory computer-readable medium of claim 18, wherein the actions performed by the one or more users with respect to the content include:

viewing a first portion of the contents, making a purchase related to a second portion of the contents, and causing a third portion of the contents to be recorded.

* * * * *